(12) United States Patent
Ohtaki

(10) Patent No.: US 8,924,806 B2
(45) Date of Patent: Dec. 30, 2014

(54) USER TERMINAL AND METHOD FOR PERFORMING RETRANSMISSION CONTROL

(75) Inventor: Yoshiaki Ohtaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 669 days.

(21) Appl. No.: 12/894,434

(22) Filed: Sep. 30, 2010

(65) Prior Publication Data

US 2011/0078528 A1 Mar. 31, 2011

(30) Foreign Application Priority Data

Sep. 30, 2009 (JP) ................ 2009-226316
Sep. 2, 2010 (JP) ................ 2010-196920

(51) Int. Cl.
G08C 25/02 (2006.01)
H04W 4/00 (2009.01)
H04L 1/18 (2006.01)
H04L 1/12 (2006.01)

(52) U.S. Cl.
CPC .............. H04L 1/187 (2013.01); H04L 1/1835 (2013.01); *H04L 2001/125* (2013.01)
USPC ........... 714/748; 714/749; 714/750; 714/751; 370/329; 370/341

(58) Field of Classification Search
None
See application file for complete search history.

(56) References Cited

U.S. PATENT DOCUMENTS

2006/0013161 A1 1/2006 Suzuki
2010/0005354 A1* 1/2010 Zhu et al. ................ 714/749
2010/0014474 A1 1/2010 Miki et al.
2010/0077272 A1* 3/2010 Peisa et al. ................ 714/748
2010/0153803 A1* 6/2010 Harada et al. ............ 714/748
2013/0007550 A1* 1/2013 Harada et al. ............ 714/749

FOREIGN PATENT DOCUMENTS

| JP | 2006-033156 A | 2/2006 | |
| JP | 2007-502558 A | 2/2007 | |
| JP | 2008-092378 A | 4/2008 | |
| WO | WO-2005-018241 | 2/2005 | |
| WO | WO 2008096878 A1 * | 8/2008 | ............ H04L 1/16 |

OTHER PUBLICATIONS

"11.6.2.2 HARQ process", 3rd Generation Partnership Project; Technical Specification Group Radio Access Network; Medium Access Control (MAC) protocol specification (Release 6) Mar. 2008, pp. 68-69.

* cited by examiner

*Primary Examiner* — Albert Decady
*Assistant Examiner* — Justin R Knapp
(74) *Attorney, Agent, or Firm* — Fujitsu Patent Center

(57) ABSTRACT

A user terminal for receiving a plurality of data pieces for a plurality of processes that are simultaneously operated. Each of the data pieces has an indicator indicating whether the data piece is new data and is transmitted from a network apparatus that changes an indicator value on a process-by-process basis. The user terminal includes a data receiving unit for receiving the data piece having the indicator, a response transmitting unit for transmitting a response indicating an acknowledgement or a negative acknowledgement for the received data piece, and an indicator determination unit for determining whether the indicator of the received data piece is the same as the indicator of a previous data piece received immediately previously for the same process as the process of the received data piece and whether the response for the previous data piece indicates the acknowledgement to discard the received data piece.

10 Claims, 9 Drawing Sheets

USER TERMINAL AND METHOD FOR PERFORMING RETRANSMISSION CONTROL

CROSS-REFERENCE TO RELATED APPLICATIONS

This application is based upon and claims the benefit of priority of the prior Japanese Patent Application No. 2009-226316, filed on Sep. 30, 2009, and the prior Japanese Patent Application No. 2010-196920, filed on Sep. 2, 2010, the entire contents of which are incorporated herein by reference.

FIELD

The present invention relates to an apparatus and method for performing data retransmission control.

BACKGROUND

HARQ protocols have been known as protocols for retransmission control that is used in wireless communication networks.

Transmission and reception of data of the related art, which is performed in accordance with an HARQ protocol, will be described with reference to FIG. 1. The top row of FIG. 1 illustrates a procedure that is performed by a network apparatus NE such as a base station or a high-level node (a radio network controller (RNC)). The bottom row of FIG. 1 illustrates a procedure that is performed by a user terminal UE such as a mobile phone. The network apparatus assigns sub-frames to each of processes, and transmits and receives data. The network apparatus transmits and receives, together with the data, control information such as an identifier identifying the process, an indicator indicating whether or not the data is new data, and so forth.

The processes are HARQ procedures. Units of physical resources are determined for the processes. For example, one time slot or a plurality of time slots are assigned in a time division multiplexing scheme. One sub-carrier or a plurality of sub-carriers are assigned in a frequency division multiplexing scheme. A process number that is used as an identifier for identifying each of the processes is assigned to the process. In HARQ, a plurality of processes independent from one another are simultaneously operated. Physical resources are assigned to as many processes as possible within a round-trip delay time between communication apparatuses. Packets for each of the processes are sequentially transmitted. Thus, a high transmission efficiency is realized.

The indictor is, for example, a new data indicator (NDI). An NDI indicates whether a packet to which the NDI is assigned includes newly transmitted data or retransmitted data. Two values, e.g., one and zero, are used as values of NDIs, and the value of an NDI is changed from one of the two values into the other value every time transmission of data is performed. Accordingly, an apparatus on a receiving side can determine that, when the apparatus has continuously received pieces of data having NDIs whose values are the same, the piece of data transmitted later is retransmitted data.

When the network apparatus NE performs transmission of data for a process denoted by a process number P of zero, the network apparatus NE attaches the process number P of zero, an NDI of zero, a transmittable data size TBsize of A to data 1, and transmits the data 1 using a sub-frame 1.

The network apparatus NE transmits, using a sub-frame 4, data to which another process number is attached for another process. Data 2 that is transmitted using the sub-frame 4 has a process number P of one, an NDI of one, and a TBsize of B. The network apparatus NE changes (toggles) the value of an NDI into a different value every time the network apparatus NE transmits data, thereby indicating that the transmitted data is new data. In an example illustrated in FIG. 1, when transmission of pieces of data is performed using the sub-frames 1, 4, 7, 10, and 13, the value of each of the NDIs is toggled so that the values of the NDIs are sequentially zero, one, zero, one, and zero.

In the sub-frame 7, when the network apparatus NE receives an acknowledgement (ACK) for the data 1 that the network apparatus NE transmitted using the sub-frame 1, the network apparatus NE transmits the next data for the process denoted by the process number P of zero. Furthermore, when the network apparatus NE receives an ACK for the data that the network apparatus NE transmitted using the sub-frame 4, the network apparatus NE transmits the next data for a process denoted by the process number P of one. Thereafter, the network apparatus NE repeats, for each of the process denoted by the process number P of zero (indicated by the solid line) and the process denoted by the process number P of one (indicated by the broken line), a procedure that is similar to the above-described procedure.

When the user terminal UE receives data from the network apparatus NE, the user terminal UE stores the data, and performs cyclic redundancy check (CRC) on the data. When no error is detected, the user terminal UE returns an ACK.

A retransmission procedure of the related art, which is performed in accordance with an HARQ protocol, will be described with reference to FIG. 2. FIG. 2 differs from FIG. 1 in that the network apparatus NE incorrectly detects, as a negative acknowledgement (NACK), an ACK that is transmitted from the user terminal UE.

Because the network apparatus NE detects an NACK for the data 1 that was transmitted using the sub-frame 1, the network apparatus NE retransmits the data 1.

Because the user terminal UE detected no error for the data 1 that was received using the sub-frame 1, the user terminal UE transmitted an ACK back. However, the user terminal UE needs to handle, as new data, the data 1 that the network apparatus NE has retransmitted. In this case, the user terminal UE needs to perform, again, the procedure of storing the data 1, which has been retransmitted, in a buffer, of performing CRC on the data 1, and of returning an ACK when no error is detected.

Also when the network apparatus NE cannot detect an ACK that the user terminal UE has transmitted, a procedure that is similar to the procedure illustrated in FIG. 2 is performed.

The following documents describe related technologies.
Japanese Laid-Open Patent Publication No. 2007-502558.
Japanese Laid-Open Patent Publication No. 2008-092378.
Japanese Laid-Open Patent Publication No. 2006-033156.

SUMMARY

According to an aspect of the embodiment, a user terminal for receiving a plurality of data pieces for a plurality of processes that are simultaneously operated, each of the data pieces having an indicator indicating whether the data piece is new data or retransmitted data, the data pieces being transmitted from a network apparatus that changes a value of the indicator on a process-by-process basis, includes a data receiving unit for receiving the data piece having the indicator, a response transmitting unit for transmitting, to the network apparatus, a response indicating an acknowledgement or a negative acknowledgement for the received data piece, and an indicator determination unit for determining whether the indicator of the received data piece is the same as the indicator of a previous data piece received immediately previously for the same process as the process of the received data piece and whether the response for the previous data piece indicates the acknowledgement to discard the received data piece.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments are related to an apparatus and method for performing retransmission control in accordance with a hybrid automatic repeat request (HARQ) protocol.

Figure 1:
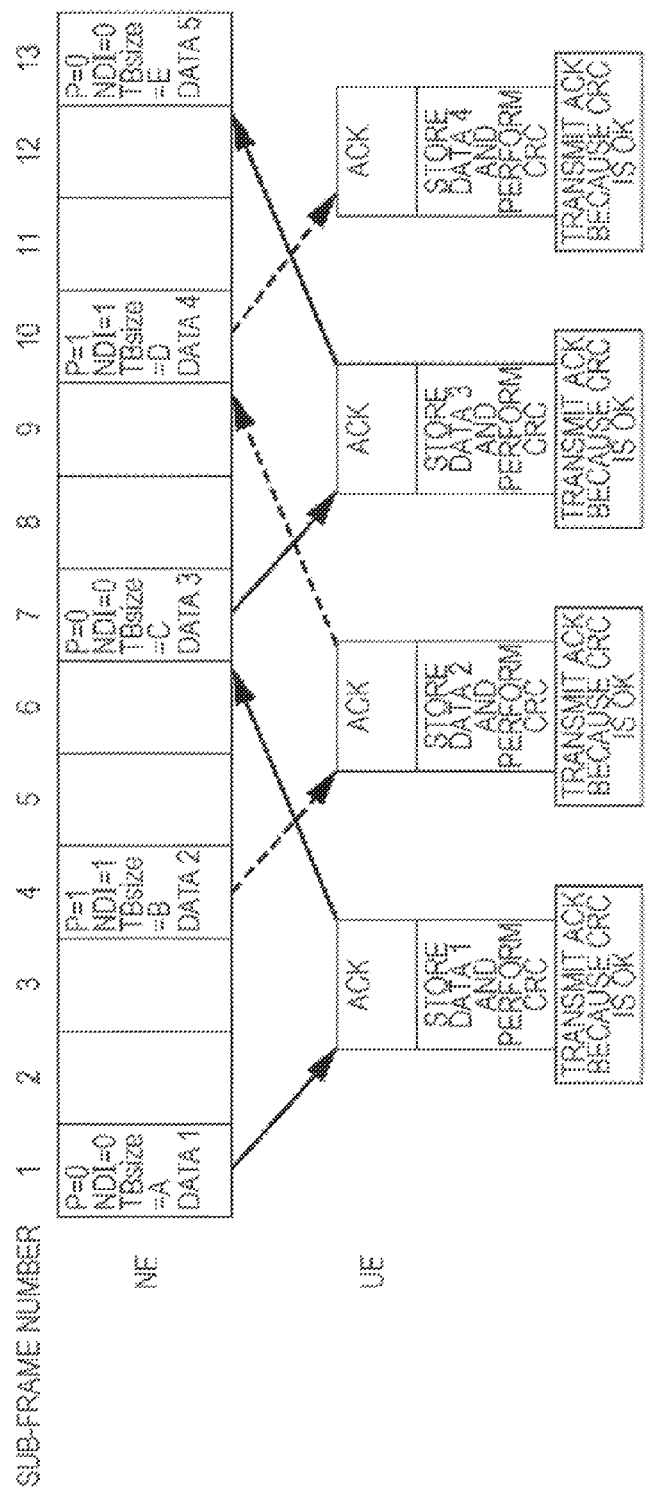
FIG. 1 is a diagram for explaining transmission and reception of data of the related art, which is performed in accordance with an HARQ protocol.
Figure 2:
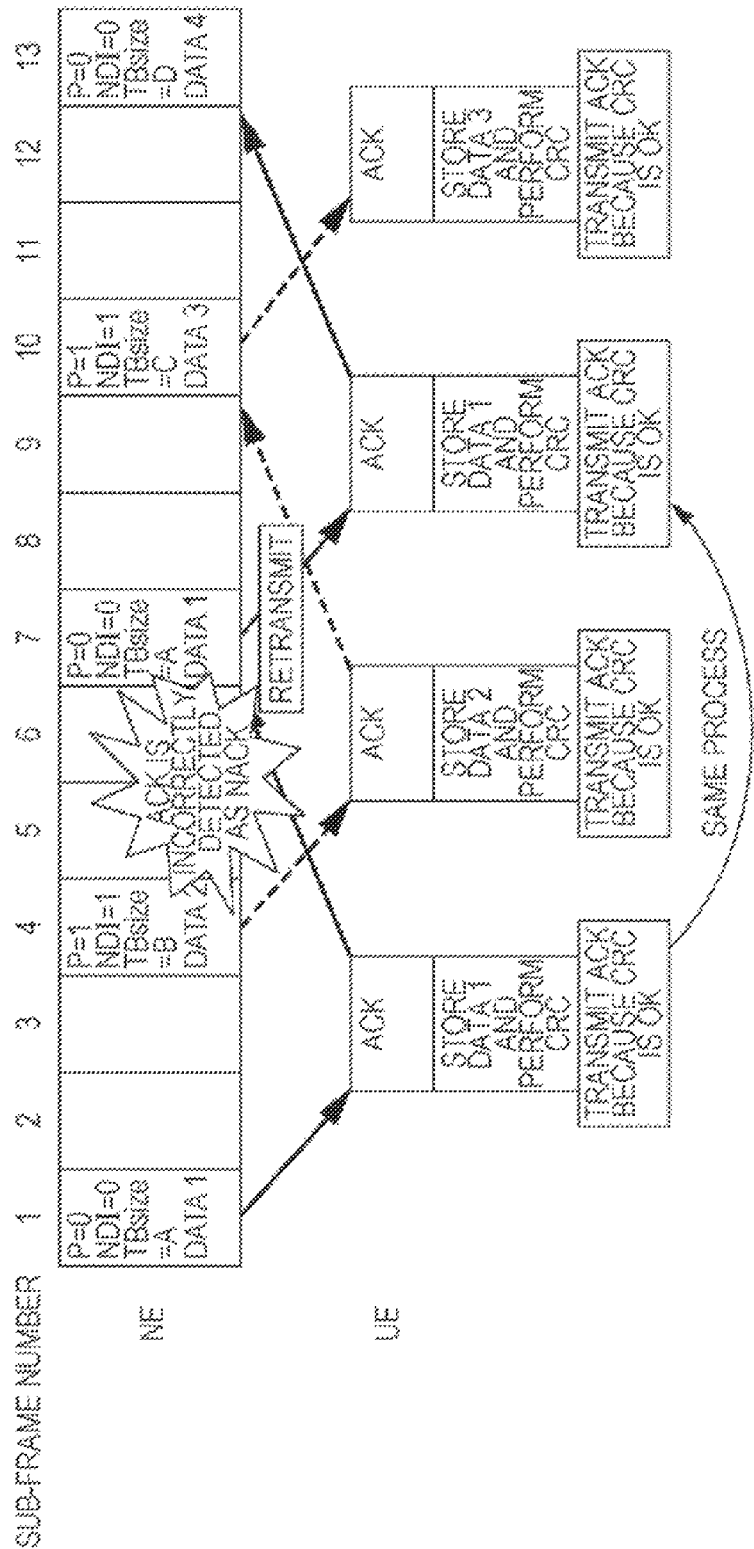
FIG. 2 is a diagram for explaining a retransmission procedure of the related art, which is performed in accordance with the HARQ protocol.

In the methods that are illustrated in FIGS. 1 and 2, although the user terminal UE has already correctly received data, the user terminal UE treats the retransmitted data in a manner that is similar to a manner in which new data is treated. Thus, there is a problem that the efficiency of a retransmission procedure is low.

Hereinafter, preferred embodiments will be explained with reference to accompanying drawings.

Normal Procedure

Figure 3:
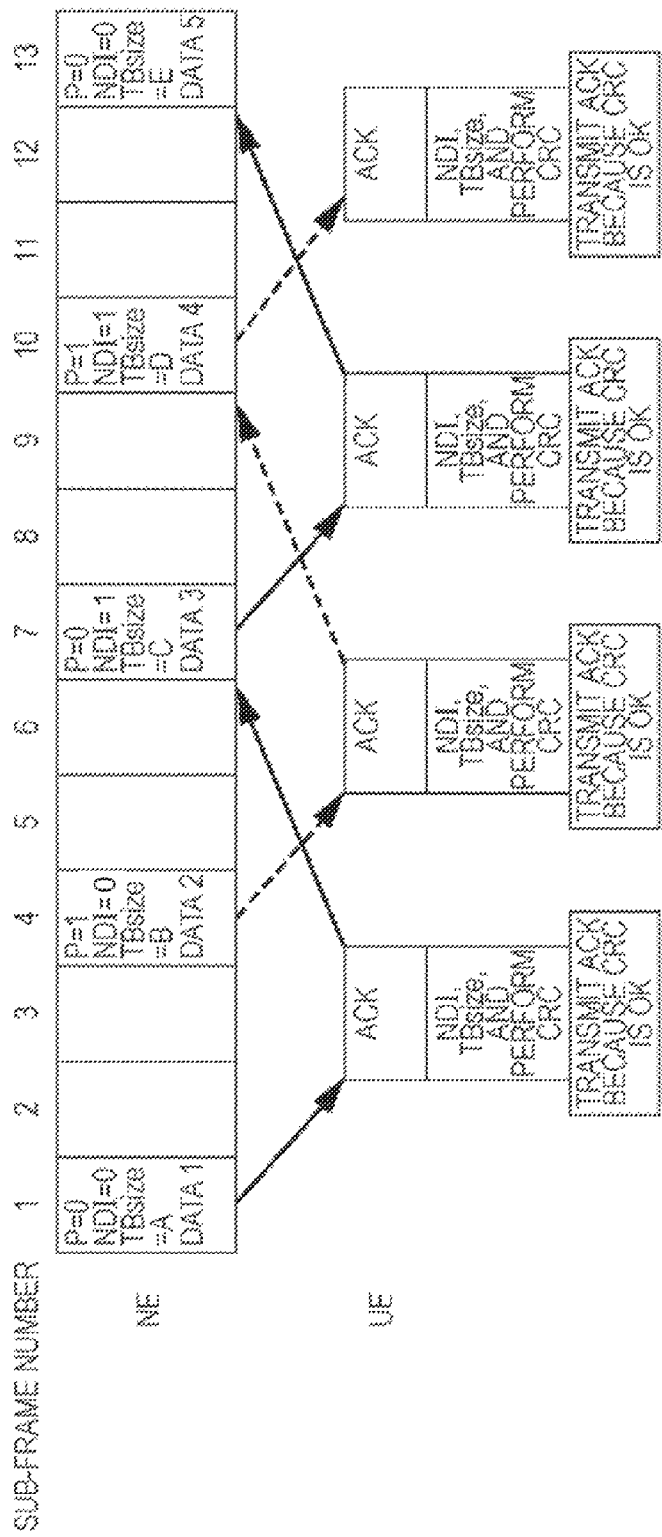
FIG. 3 is a diagram for explaining transmission and reception of data according to an embodiment of the present invention.

Transmission and reception of data according to an embodiment of the present invention will be described with reference to FIG. 3. FIG. 3 differs from FIG. 1 in a method for attaching an NDI. In FIG. 1, the network apparatus NE toggles the value of each of NDIs so that the values of the NDIs are zero, one, zero, one, . . . every time transmission of data is performed regardless of processes. In contrast, in FIG. 3 the network apparatus NE toggles the value of each of NDIs every time transmission of data is performed on a process-by-process basis.

In FIG. 3, focusing on sub-frames 1, 7, and 13 for a process number P of zero, the value of each of NDIs is toggled so that the values of the NDIs are zero, one, and zero. Focusing on sub-frames 4 and 10 for a process number P of one, the value of each of NDIs is toggled so that the values of NDIs are zero and one.

Only some pieces of data for the two processes are illustrated in FIG. 3. However, also in a case in which a larger or smaller number of processes are performed and a case in which transmission and reception of a larger or smaller amount of data is performed, the value of each of NDIs is toggled in a manner similar to the above-described manner.

Retransmission Procedure

Figure 4:
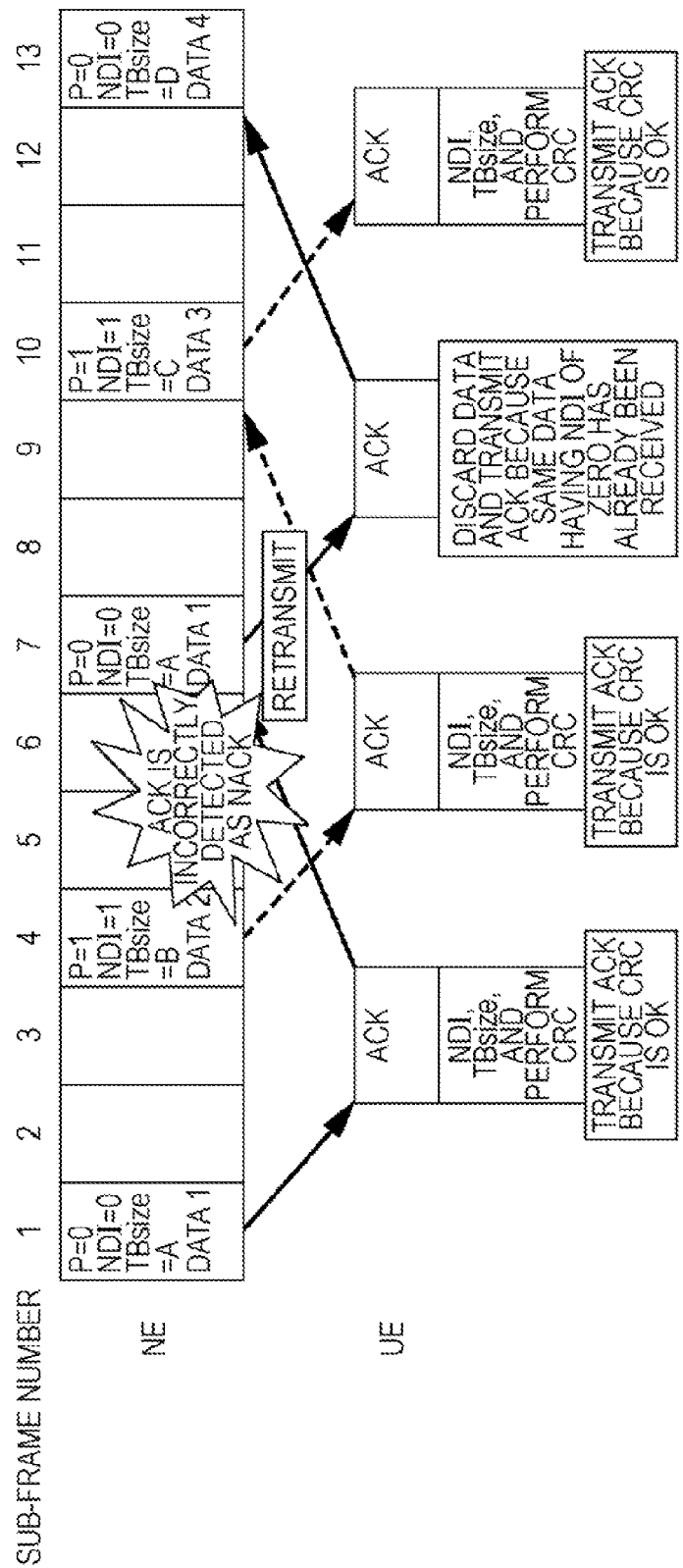
FIG. 4 is a diagram for explaining a retransmission procedure according to an embodiment of the present invention.

A retransmission procedure according to an embodiment of the present invention will be described with reference to FIG. 4. FIG. 4 differs from FIG. 2 in an operation of the user terminal UE in a case in which the user terminal UE has received retransmitted data. In FIG. 2, the user terminal UE treats the retransmitted data in a manner that is similar to a manner in which new data is treated. In contrast, in FIG. 4, when the user terminal UE has continuously received NDIs whose values are the same for the same process, the user terminal UE discards the data that has the NDI whose value is the same value and that was received later, and returns an ACK.

The user terminal UE performs CRC on data 1 that has been received using a sub-frame 1 from the network apparatus NE. Because the user terminal UE detects no error, the user terminal UE transmits an ACK back. However, because the network apparatus NE incorrectly detects the ACK as an NACK, the network apparatus NE retransmits the data 1 using a sub-frame 7.

The user terminal UE checks, on a process-by-process basis, an NDI of received data. The user terminal UE checks the value of a process number P and the value of an NDI that are attached to the data 1 which the network apparatus NE has retransmitted using the sub-frame 7. The user terminal UE detects that the retransmitted data 1 has, for a process number P of zero, an NDI of zero that is the same as the value of an NDI of the data 1 immediately previously received.

Because the user terminal UE has continuously received pieces of data having the NDIs of zero that are the same for the same process number P of zero, the user terminal UE determines that the network apparatus NE retransmitted the same data although the user terminal UE transmitted an ACK back. The user terminal UE received the data 1 before. Accordingly, the user terminal UE discards the data 1 that has been received again without storing the data 1 in a buffer, and transits an ACK without performing CRC. Thus, the user terminal UE can transmit an ACK back at a time before a time at which the user terminal UE transmits an ACK back using the procedure illustrated in FIG. 2. Thus, an increase in the speed of a retransmission procedure can be realized.

In another embodiment, the user terminal UE checks whether or not, in addition to the values of NDIs, the values of TBsizes are the same as each other. When the user terminal UE has continuously received pieces of data having NDIs whose values are the same and having TBsizes whose values are the same for the same process, the user terminal UE determines that the network apparatus NE retransmitted the same data. As in the above-described embodiment, the user terminal UE discards the data that has been received again without storing the data in a buffer, and transmits an ACK back without performing CRC.

When the user terminal UE has received pieces of data having NDIs whose values are the same and having TBsizes whose values are different from each other for the same process, the user terminal UE determines that the user terminal UE incorrectly detected the NDIs of the pieces of data that were received, and treats, as new data, the data that was received later. Accordingly, even when the user terminal UE incorrectly detects an NDI, wasting of received data is prevented. Thus, the accuracy of the retransmission procedure can be increased, compared with the accuracy of the retransmission procedure in the above-described embodiment.

When the user terminal UE has received pieces of data having NDIs whose values are different from each other and having TBsizes whose values are the same for the same process, the user terminal UE determines that the user terminal UE incorrectly detected the NDIs of the pieces of data that were received and the network apparatus NE retransmitted the same data, and discard the data that was received later. Accordingly, even when the user terminal UE incorrectly detects an NDI, an increase in the speed of a retransmission procedure can be realized.

Flow of Normal Procedure

Figure 5:
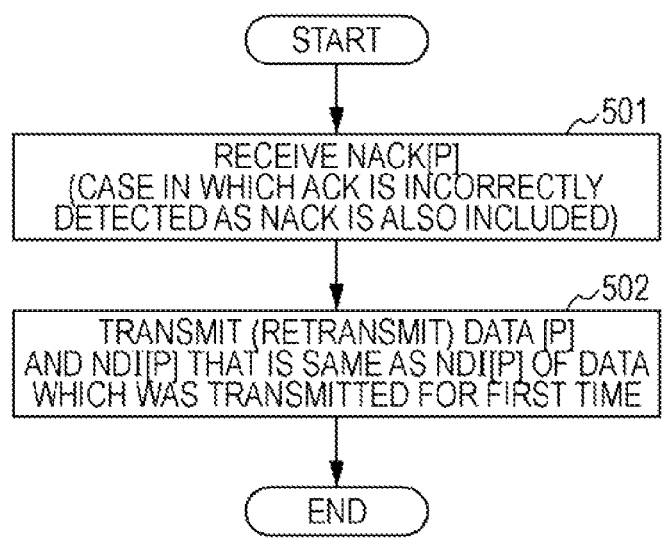
FIG. 5 is a flowchart of a retransmission procedure according to an embodiment of the present invention, which is performed by a network apparatus.

A retransmission procedure according to an embodiment of the present invention, which is performed by the network apparatus NE, will be described with reference to FIG. 5.

In step 501, the network apparatus NE receives an NACK from the user terminal UE. This reception of the NACK includes the case where the network apparatus NE incorrectly detects, as an NACK, an ACK that the user terminal UE has transmitted. A process number P is attached to the NACK or the NACK that has been incorrectly detected.

In step 502, the network apparatus NE retransmits data. In this case, the network apparatus NE attaches, to the data, an NDI whose value is the same as the value of an NDI that is attached to data transmitted for the first time.

Flow of Retransmission Procedure

Figure 6:
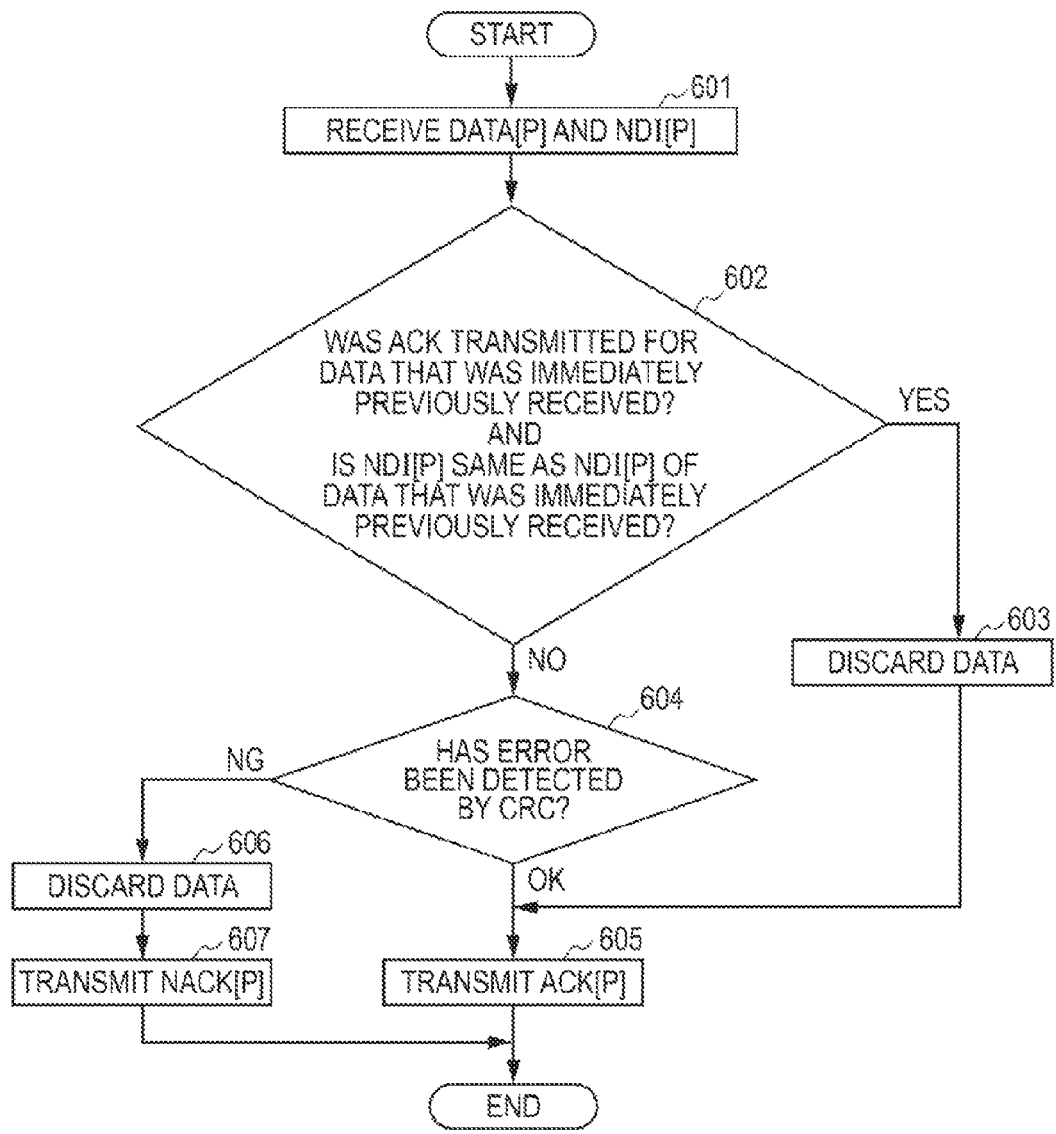
FIG. 6 is a flowchart of a procedure according to an embodiment of the present invention, which is performed by a user terminal.

A procedure according to an embodiment of the present invention, which is performed by the user terminal UE, will be described with reference to FIG. 6.

In step 601, the user terminal UE receives data having a process number P and an NDI from the network apparatus NE.

In step 602, the user terminal UE compares the NDI of the data that has been received in step 601 with an NDI of data that was immediately previously received for the same process as that denoted by the process number of the data. And the user terminal UE determines whether the user terminal UE transmitted, to the network apparatus NE, an ACK for the data that was immediately previously received for the same process.

When the user terminal UE transmitted the ACK for the data that was immediately previously received for the same process and when the values of the two NDIs are the same, i.e., when the user terminal UE has continuously received pieces of data having NDIs whose values are the same for the same process, the user terminal UE proceeds to step 603. When the user terminal UE transmitted an NACK for the data that was immediately previously received for the same process or when the values of the two NDIs are different from each other, i.e., when the user terminal UE has not continuously received pieces of data having NDIs whose values are the same for the same process, the user terminal UE proceeds to step 604.

In step 603, the user terminal UE discards the data that was received in step 601.

In step 604, the user terminal UE performs CRC on the data that was received in step 601. As a result of CRC, when an error is detected, the user terminal UE proceeds to step 605. As a result of CRC, when no error is detected, the user terminal UE proceeds to step 606.

In step 605, the user terminal UE transmits an ACK back for the data that was received in step 601.

In step 606, the user terminal UE discards the data that was received in step 601.

In step 607, the user terminal UE transmits an NACK back for the data that was received in step 601.

Flow of Retransmission Procedure: Case in Which TBsize Is Considered

Figure 7:
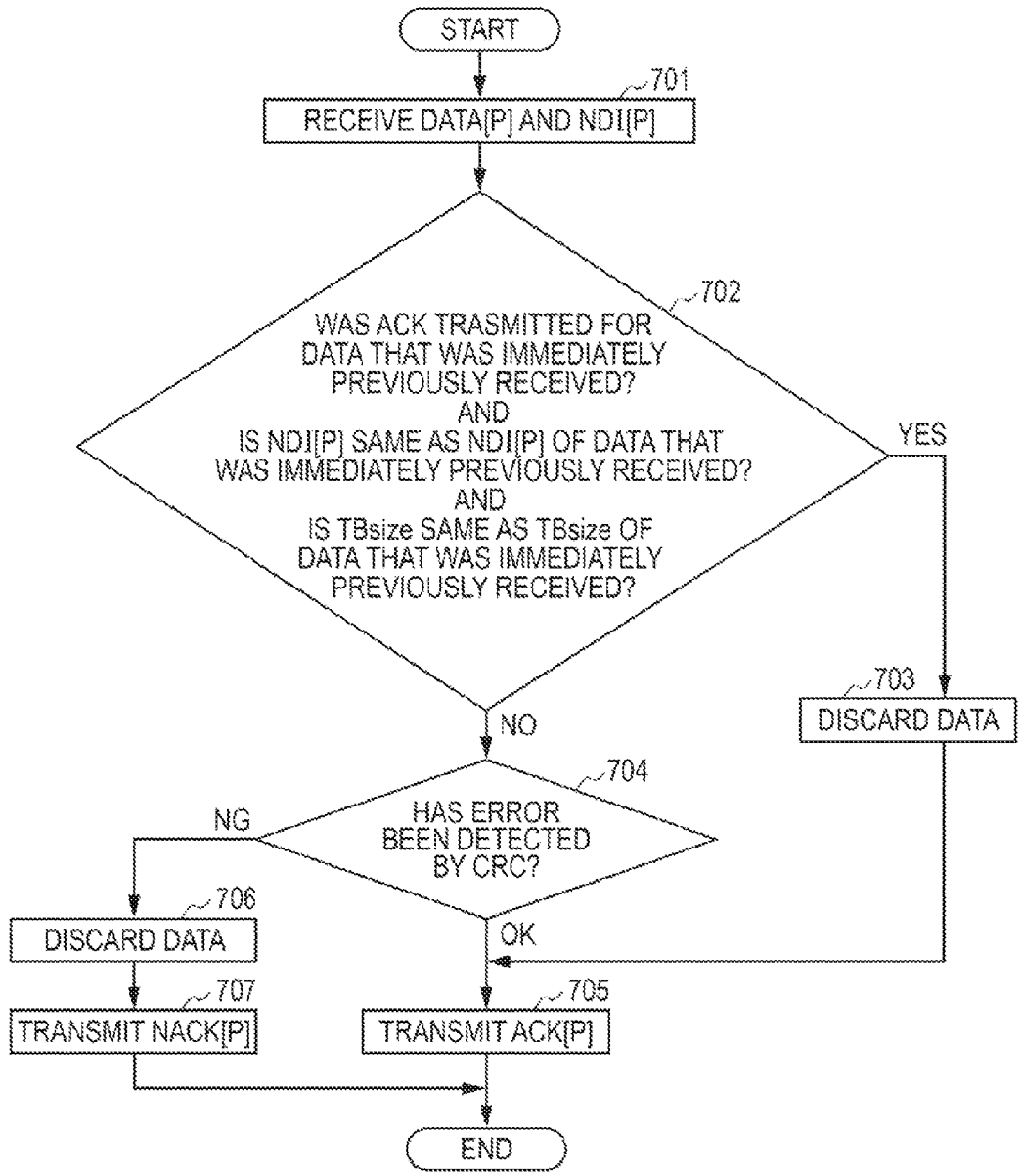
FIG. 7 is a flowchart of a procedure according to an embodiment of the present invention, which is performed by the user terminal in a case in which a transmittable data size is considered.

A procedure according to an embodiment of the present invention, which is performed by the user terminal UE in a case in which a transmittable data size is considered, will be described with reference to FIG. 7. FIG. 7 differs from FIG. 6 in that comparison of a transmittable data size TBsize of received data in addition to an NDI of the received data is performed. For example, the transmittable data size TBsize is a transport block size of the data transmitted from the network apparatus NE. Steps 701 and 703 to 707 illustrated in FIG. 7 correspond to steps 601 and 603 to 607 illustrated in FIG. 6.

In step 702, the user terminal UE compares an NDI and a TBsize of data that has been received in step 701 with an NDI and a TBsize of data that was immediately previously received for the same process as that denoted by a process number of the data. And the user terminal UE determines whether the user terminal UE transmitted, to the network apparatus NE, an ACK for the data that was immediately previously received for the same process.

When the user terminal UE transmitted the ACK for the data that was immediately previously received for the same process and when the values of the two NDIs are the same and the values of the two TBsizes are the same, i.e., when the user terminal UE has continuously received pieces of data having NDIs whose values are the same and having TBsizes whose values are the same for the same process, the user terminal UE proceeds to step 703. When the user terminal UE transmitted an NACK for the data that was immediately previously received for the same process or when the values of the two NDIs are different from each other and the values of the two TBsizes are different from each other, the user terminal UE proceeds to step 704.

Configuration of Network Apparatus

Figure 8:
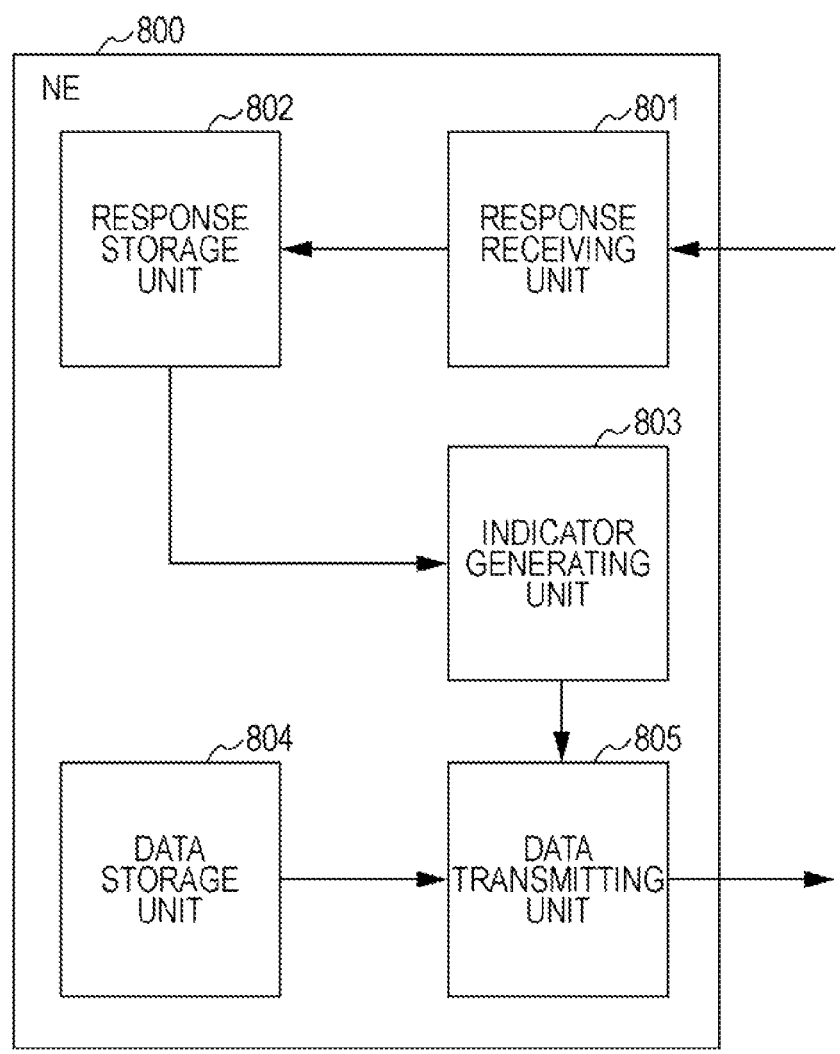
FIG. 8 is a block diagram of a network apparatus according to an embodiment of the present invention.

A configuration of a network apparatus NE according to an embodiment of the present invention will be described with reference to FIG. 8. As illustrated in FIG. 8, the network apparatus NE (800) includes a response receiving unit 801, a response storage unit 802, an indicator generating unit 803, a data storage unit 804, and a data transmitting unit 805.

The response receiving unit 801 receives an ACK or an NACK from a user terminal UE. Each of the ACK and NACK has a process number P and an NDI that are illustrated in FIGS. 3 and 4.

The response storage unit 802 stores the ACK or NACK that the response receiving unit 801 has received.

The indicator generating unit 803 reads the ACK or NACK that is stored in the response storage unit 802, and generates an NDI that should be transmitted next. When the ACK is read as a response, the indicator generating unit 803 toggles the value of the NDI included in the ACK to generate an NDI that should be transmitted next. When the NACK is read as a response, the indicator generating unit 803 generates, as an NDI that should be transmitted next, an NDI whose value is the same as the value of the NDI included in the NACK. In other words, the indicator generating unit 803 does not toggle the value of the NDI. Here, a case in which the NACK is read as a response includes a case in which the network apparatus NE incorrectly detects, as an NACK, an ACK that the user terminal UE has transmitted.

The data storage unit 804 stores data. Data that has been already transmitted is also stored only in a predetermined period or only a predetermined amount of data that has been already transmitted is also stored, for a case in which retransmission of the data is necessary. Any value may be determined, on an as needed basis, as the period in which the data is held, the amount of data that is held, or the like for retransmission.

The data transmitting unit 805 attaches the NDI that the indicator generating unit 803 has generated to data that is read from the data storage unit 804, and transmits the data. The data transmitting unit 805 transmits the data that was transmitted immediately previously for the same process when the NACK is read as a response from the response storage unit 802 and transmits new data when the ACK is read as a response.

Configuration of User terminal

Figure 9:
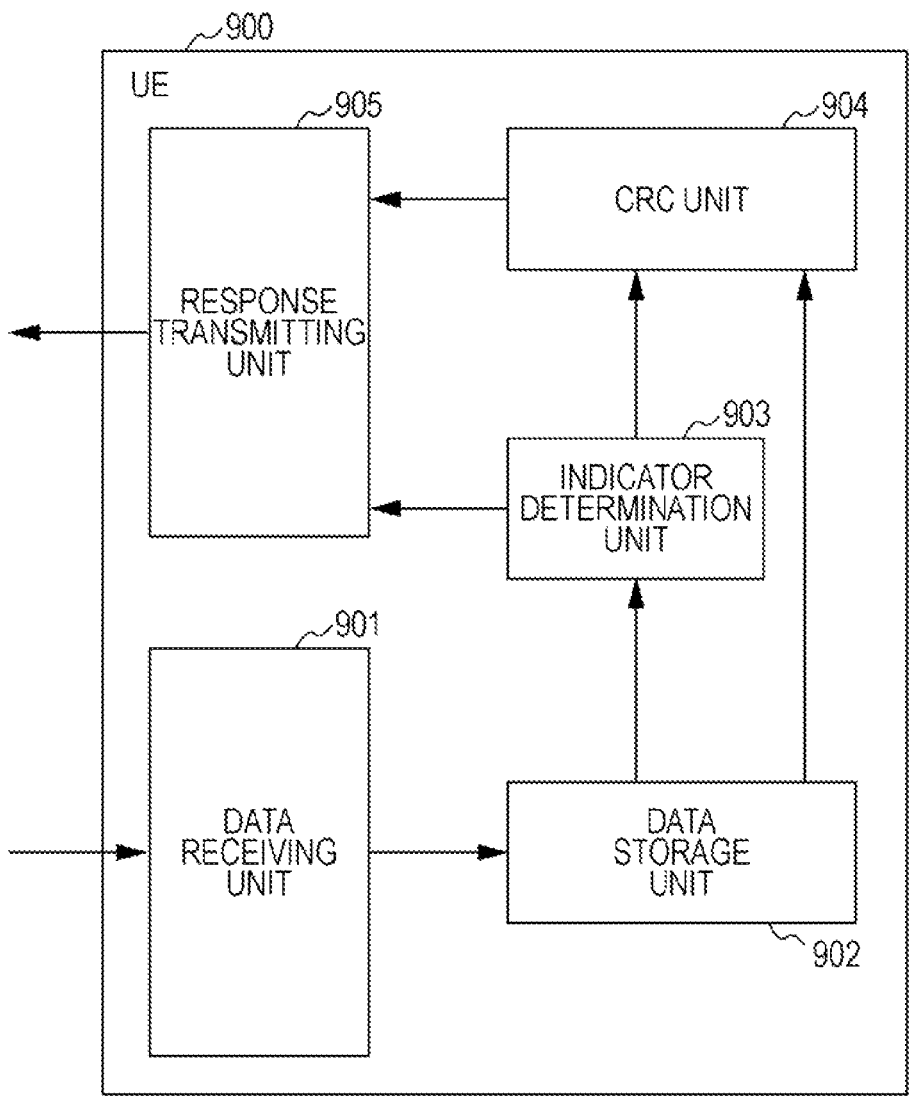
FIG. 9 is a block diagram of a user terminal according to an embodiment of the present invention.

A configuration of a user terminal UE according to an embodiment of the present invention will be described with reference to FIG. 9. As illustrated in FIG. 9, the user terminal UE (900) includes a data receiving unit 901, a data storage unit 902, an indicator determination unit 903, a CRC unit 904, and a response transmitting unit 905.

The data receiving unit 901 receives data from a network apparatus NE.

The data storage unit 902 stores the data that the data receiving unit 901 has received. The received data has a process number P, an NDI, which are illustrated in FIGS. 3 and 4, and a TBsize described above. The data storage unit 902 may store the information indicating whether the response transmitting unit 905 transmitted, to the network apparatus NE, an ACK for the data that was immediately previously received for the same process.

The indicator determination unit 903 reads the data that is stored in the data storage unit 902, and compares the NDI of the data with an NDI of data that was immediately previously received for the same process. And the indicator determination unit 903 determines whether the response transmitting unit 905 transmitted, to the network apparatus NE, an ACK for the data that was immediately previously received for the same process. When the response transmitting unit 905 transmitted the ACK for the data that was immediately previously received for the same process and when the values of the two NDIs are the same, i.e., when pieces of data having NDIs whose values are the same have been continuously received for the same process, the indicator determination unit 903 discards the data that was received later from the data storage unit 902, and instructs the response transmitting unit 905 to transmit an ACK back.

When the response transmitting unit 905 transmitted an NACK for the data that was immediately previously received for the same process or when the values of the two NDIs are different from each other, i.e., when pieces of data having NDIs whose values are the same have not been continuously received for the same process, the indicator determination unit 903 instructs the CRC unit 904 to perform CRC on the received data.

When the CRC unit 904 receives the instruction for performing CRC from the indicator determination unit 903, the CRC unit 904 performs CRC on the data that is read from the data storage unit 902. As a result of CRC, when the CRC unit 904 detects an error, the CRC unit 904 discards the data from the data storage unit 902, and instructs the response transmitting unit 905 to transmit an NACK back. As a result of CRC, when the CRC unit 904 detects no error, the CRC unit 904 instructs the response transmitting unit 905 to transmit an ACK back.

The response transmitting unit 905 transmits the ACK or NACK back to the network apparatus NE in accordance with the instruction that is provided from the indicator determination unit 903 or the CRC unit 904.

According to a method and apparatus according to the present embodiment, the efficiency of retransmission control that is performed in accordance with an HARQ protocol is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A user terminal for receiving a plurality of data pieces for a plurality of processes that are simultaneously operated, each of the data pieces having an indicator indicating whether the data piece is new data or retransmitted data, the data pieces being transmitted from a network apparatus that changes a value of the indicator on a process-by-process basis, the user terminal comprising:
 a data receiving unit for receiving the data pieces with their corresponding indicator and a transmittable data size for each of the data pieces;
 a response transmitting unit for transmitting, to the network apparatus, a response indicating an acknowledgement or a negative acknowledgement for a received data piece; and
 an indicator determination unit for
  determining whether the indicator of the received data piece is the same as the indicator of a previous data piece received immediately previously for the same process as the process of the received data piece,
  determining whether the transmittable data size of the received data piece is the same as the transmittable data size of the previous data piece, and
  discarding, when the indicators are the same and the transmittable data sizes are the same, the received data piece.

2. The user terminal according to claim 1,
 wherein, when the data pieces having the same indicators are received continuously for the same process, the indicator determination unit discards the data piece that is received later.

3. The user terminal according to claim 1,
 wherein the each of the data pieces has an identifier indicating which process of the plurality of processes the data piece is for,
 wherein the indicator determination unit further determines whether the identifier of the received data piece is the same as the identifier of the previous data piece to determine whether the received data piece and the previous data piece are for the same process.

4. The user terminal according to claim 1, further comprising:
 a data storage unit for storing the data pieces having the indicators received by the data receiving unit,
 wherein the indicator determination unit discards the received data piece that is stored in the data storage unit.

5. The user terminal according to claim 1,
wherein, when the indicator of the received data piece is the same as the indicator of the previous data piece for the same process and the response for the previous data piece indicates the acknowledgement, the indicator determination unit discards the received data piece without performing an error detection and the response transmitting unit retransmits the response indicating the acknowledgement to the network apparatus.

6. The user terminal according to claim 1, further comprising:
an error detection unit for performing an error detection of the received data piece,
wherein, when the error detection unit detects an error, the error detection unit discards the received data piece and the response transmitting unit transmits the response indicating the negative acknowledgement to the network apparatus,
wherein, when the error detection unit does not detect any error, the response transmitting unit transmits the response indicating the acknowledgement to the network apparatus.

7. A method, executed by a user terminal, for performing retransmission control over a plurality of data pieces for a plurality of processes that are simultaneously operated in a data transmitting and receiving system including a network apparatus and the user terminal, the method comprising:
receiving the data pieces with their corresponding indicator and a transmittable data size for each of the data pieces;
transmitting, to the network apparatus, a response indicating an acknowledgement or a negative acknowledgement for a received data piece;
determining whether the indicator of the received data piece is the same as the indicator of a previous data piece received immediately previously for the same process as the process of the received data piece determining whether the transmittable data size of the received data piece is the same as the transmittable data size of the previous data piece, and
discarding, when the indicators are the same and the transmittable data sizes are the same, the received data piece.

8. The method according to claim 7, further comprising:
discarding the received data piece without performing an error detection and retransmitting the response indicating the acknowledgement to the network apparatus, when the user terminal determines that the indicator of the received data piece is the same as the indicator of the previous data piece for the same process and the response for the previous data piece indicates the acknowledgement.

9. A communication system, comprising:
a network apparatus; and
a user terminal configured to:
receive a plurality of data pieces for a plurality of processes that are simultaneously operated, each of the data pieces having an indicator indicating whether the data piece is new data or retransmitted data, the data pieces being transmitted from the network apparatus that changes a value of the indicator on a process-by-process basis,
receive a transmittable data size for each of the data pieces,
transmit, to the network apparatus, a response indicating an acknowledgement or a negative acknowledgement for a received data piece;
determine whether the indicator of the received data piece is the same as the indicator of a previous data piece received immediately previously for the same process as the process of the received data piece determine whether the transmittable data size of the received data piece is the same as the transmittable data size of the previous data piece, and
discard, when the indicators are the same and the transmittable data sizes are the same, the received data piece.

10. The system according to claim 9, where the terminal is further configured to:
discard the received data piece without performing an error detection and retransmitting the response indicating the acknowledgement to the network apparatus, when the user terminal determines that the indicator of the received data piece is the same as the indicator of the previous data piece for the same process and the response for the previous data piece indicates the acknowledgement.

* * * * *